United States Patent
Chetrit et al.

(10) Patent No.: US 9,009,585 B1
(45) Date of Patent: Apr. 14, 2015

(54) SOFTWARE WIZARD INTERFACE

(75) Inventors: Ronen Ben Chetrit, Kiriat Ono (IL);
Dan Gluskin, Tel Aviv (IL); Nimrod Dezent, Kfar Saba (IL); Itai Ephraim Zilbershtein, Hod-Hasharon (IL); Kurt H. Haserodt, Westminster, CO (US)

(73) Assignees: Avaya Technology LLC, Basking Ridge, NJ (US); Avaya Communication Israel Ltd. (IL)

( * ) Notice: Subject to any disclaimer, the term of this patent is extended or adjusted under 35 U.S.C. 154(b) by 1336 days.

(21) Appl. No.: 12/050,325

(22) Filed: Mar. 18, 2008

(51) Int. Cl.
*G06F 17/00* (2006.01)
*G06F 9/24* (2006.01)

(52) U.S. Cl.
CPC ........................ *G06F 9/24* (2013.01)

(58) Field of Classification Search
USPC .............. 715/221, 235, 273, 234, 760
See application file for complete search history.

(56) References Cited

U.S. PATENT DOCUMENTS

| | | | |
|---|---|---|---|
| 6,871,340 B1 * | 3/2005 | Gillis | 717/100 |
| 7,213,212 B2 * | 5/2007 | Bybee et al. | 715/760 |
| 7,290,215 B2 * | 10/2007 | Bybee et al. | 715/760 |
| 7,356,773 B1 * | 4/2008 | Barraclough | 715/762 |
| 7,447,994 B2 * | 11/2008 | Mase et al. | 715/735 |
| 8,127,224 B2 * | 2/2012 | Vincent, III | 715/222 |
| 8,250,532 B2 * | 8/2012 | Guyette | 717/120 |
| 2001/0014868 A1 * | 8/2001 | Herz et al. | 705/14 |
| 2003/0046201 A1 * | 3/2003 | Cheyer | 705/35 |
| 2004/0177001 A1 * | 9/2004 | Salinas | 705/14 |
| 2005/0147090 A1 | 7/2005 | MacLeod Beck et al. | |
| 2006/0026067 A1 * | 2/2006 | Nicholas et al. | 705/14 |
| 2006/0153173 A1 * | 7/2006 | Beck et al. | 370/352 |
| 2006/0187902 A1 | 8/2006 | Birch et al. | |
| 2006/0235953 A1 | 10/2006 | Meier | |
| 2007/0143181 A1 | 6/2007 | Linkner et al. | |
| 2007/0168916 A1 | 7/2007 | Dahlin et al. | |
| 2013/0198628 A1 * | 8/2013 | Ethier et al. | 715/709 |

FOREIGN PATENT DOCUMENTS

EP    1 724 676    11/2006

OTHER PUBLICATIONS

"Hexamind: Configure Anything™"; 12 pages; downloaded from www.hexamind.com; © 2004-2008 Hexamind Ltd; All rights reserved.

* cited by examiner

*Primary Examiner* — Stephen Hong
*Assistant Examiner* — Matthew Ludwig
(74) *Attorney, Agent, or Firm* — Sheridan Ross P.C.

(57) ABSTRACT

A method of creating a software wizard. The method involves receiving, by a computer, an instruction to create a wizard, displaying by the computer one or more forms, created before receiving the instruction to create the wizard, receiving by the computer one or more customization instructions of at least one of the displayed one or more forms and storing a file defining a wizard including the displayed one or more forms as customized by the one or more customization instructions.

23 Claims, 4 Drawing Sheets

SOFTWARE WIZARD INTERFACE

FIELD

The present specification relates to software development and particularly to development of software wizards.

BACKGROUND

The Internet is used to exchange information between computers all over the world. Generally, server computers carry information organized in web pages, open for access by client computers. Web pages may include a web form, which is designed to receive information from a user of the client computer. Simple web forms are represented by source HTML code.

Wizards are software programs that assist users in completing a task in a plurality of steps. Wizards are used in both non-web and web environments, for various tasks including, for example, to install and uninstall programs, to prepare a fax transmission and to print images.

US patent publication 2007/0143181 to Linkner et al., issued Jun. 21, 2007, describes a web based wizard for generating promotion advertisements.

US patent publication 2006/0153173 to Beck et al., issued Jul. 13, 2006, describes a client specific self help wizard which is accessible and programmable over a computer network.

Generating wizards is generally a programming task which requires large amounts of human programming resources.

U.S. Pat. No. 6,871,340 to Gillis, issued Mar. 25, 2005, describes a software wizard builder which may be used to configure a wizard to a user's needs.

The web page http://www.hexamind.com/sections/plat/ platform, downloaded on Jan. 26, 2008, describes a modeler for rapid modeling of complex configuration data. The modeler is claimed to allow intuitive definition of configuration validation rules and to include a graphical interface for authoring wizards to automate complex tasks. In addition, the Hexamind suite is reported to include wizards that automate and simplify common configuration tasks.

While a wizard builder or modeler makes the task of creating a wizard easier, the task still requires qualified designers to spend much time on the task and improvements are still required.

SUMMARY

An aspect of some embodiments relates to creating a wizard, which is based at least partially on a plurality of web forms accessible also separately not through the wizard. Optionally, the wizard uses the forms non-intrusively, accessing the forms only through the web based interface intended for accessing the forms, and without altering the underlying code of the forms. Using previously generated existing web forms makes the task of designing the wizard much easier, as the task of generating a wizard may even be reduced to merely selecting existing forms. This is expected to shorten the time needed to develop a wizard, to simplify the user experience and/or to increase the wizard quality.

Optionally, the display of the forms by the wizard is similar or even substantially identical to the display of the forms on their own. In some embodiments, the display of the forms during the creation of the wizard is substantially the same as when the wizard is used. Optionally, however, the wizard may disable (e.g., hide, grey out) one or more fields of the form.

An aspect of some embodiments relates to a wizard creation tool, which records the actions of a designer and generates a wizard from the monitored actions of the designer. Using such a tool, the task of generating a wizard is reduced to merely performing a sequence of steps which are to be included in the wizard. The rest of the job is optionally performed automatically by a software tracking the steps of the designer.

In some embodiments, a device installation guide and/or a wizard user guide are generated automatically for the wizard. The guide is optionally provided in the form of a word processing document, for example in a Word or PDF format, in which each form is shown together with a list of the fields to be filled out on the form and/or explanations about each field.

Alternatively or additionally, a wizard testing guide is generated automatically. The wizard testing guide optionally states the test acts that are to be performed and the results to appear responsive to the test acts.

An aspect of some embodiments relates to a wizard executor adapted to carry out a plurality of different wizards based on respective data descriptions which shape the wizards. The wizard executor optionally comprises a software program executed by a general purpose computer. The data descriptions are non-executable files which cannot be run by a computer on their own. Using such a wizard executor makes the size of stored wizards smaller, as they only need to include data and not executable code.

The wizard data descriptions optionally identify the forms of the wizard, the order of the forms in the wizard, default values to be displayed within the forms and/or fields to be deactivated. In some embodiments, the wizard data descriptions may define conditions of navigation between forms of the wizard.

At the time of execution, the wizard data description may be retrieved from storage on the computer running the wizard executor, or may be downloaded from a remote computer for the execution.

An aspect of some embodiments relates to a software based wizard adapted to display forms provided to the wizard during its execution, by a computer process separate from the wizard. In some embodiments, the computer process separate from the wizard is executed on a different computer from the computer executing the wizard. Optionally, the forms are provided to the wizard by a web server, which operates according to standard web browsing procedures. Having forms of the wizard managed externally reduces the size of the stored wizard. Making it more easily transferred and stored.

In some embodiments, a software based wizard displays forms received during its execution from a plurality of different form server processes, possibly located on a plurality of computers.

The wizard optionally collects information entered by the user while filling out the forms and provides the filled out information to the server(s) providing the forms. In some embodiments, after each form is filled out by the user, the information is provided to the server, before (or in parallel to) displaying a further form to the user. Alternatively, the wizard collects the user responses to all the forms and transfers the responses to the servers upon completion of the wizard.

An aspect of some embodiments relates to a software based wizard configured to provide different forms to different users, according to attributes of the users, such as security levels and/or technical expertise of the user. Use of wizards that adapt themselves to the users reduces the number of wizards that need to be generated and/or allows for more personalized wizards that better suit the user's needs.

There is therefore provided in accordance with an exemplary embodiment of the invention, a method of creating a software wizard, comprising receiving, by a computer, an instruction to create a wizard, displaying by the computer one or more forms, created before receiving the instruction to create the wizard, receiving by the computer one or more customization instructions of at least one of the displayed one or more forms; and storing a file defining a wizard including the displayed one or more forms as customized by the one or more customization instructions.

Optionally, displaying the one or more forms comprises displaying forms written in HTML without script additions. Optionally, displaying the one or more forms comprises displaying forms created at least one week before receiving the instruction to create the wizard.

Optionally, the method includes accessing one or more forms included in the wizard, not through the wizard, after storing the wizard. Optionally, displaying the one or more forms comprises displaying on a client connected to the computer over a computer network.

Optionally, displaying the one or more forms comprises displaying on a client distanced from the computer by at least a kilometer. Optionally, the method includes changing the display of the form responsive to each customization instruction received.

Optionally, storing the file comprises storing an executable file and/or a data file executable by a wizard execution program. Optionally, the method includes displaying a list of available forms from which a user selects the forms to be displayed. Optionally, displaying by the computer one or more forms comprises displaying before storing the file with substantially the same view as displayed by the stored wizard.

Optionally, storing the file comprises storing a file defining a wizard including at least five forms. Optionally, the method includes generating a report relating to the stored wizard, automatically by the computer responsive to the received customization instructions. Optionally, generating the report comprises generating a test manual. Optionally, storing the file comprises storing the file with an entire description of at least one of the forms referenced by the wizard included therein. Optionally, storing the file comprises storing the file with entire descriptions of the forms referenced by the wizard included therein. Optionally, storing the file comprises storing the file with links to a description of at least one form referenced by the wizard, whose description is not included in the file.

Optionally, the method includes displaying by the computer a simulation of the wizard, between receiving by the computer customization instructions. Optionally, the method includes retrieving the stored file and executing the wizard using the retrieved file.

Optionally, executing the wizard is performed by a computer different from the computer that stored the file. Optionally, in the execution of the wizard, the one or more forms are accessed non-intrusively. Optionally, in the execution of the wizard, the one or more forms are displayed to the user in a substantially same manner as the displaying by the computer.

There is further provided in accordance with an exemplary embodiment of the invention, a method of creating a software wizard, comprising receiving, by a computer, an instruction to create a wizard; receiving by the computer indications of a plurality of web forms, accessible individually not through the created wizard; and storing a file defining a wizard including the plurality of web forms.

Optionally, the method includes receiving one or more customization instructions for at least one of the plurality of forms and wherein storing the file comprises storing a file defining a wizard including the plurality of web forms, as customized by the one or more customization instructions. Optionally, storing the file comprises storing with complete copies of the forms. Optionally, storing the file comprises storing with links to the forms on a different computer than the computer receiving the instruction to create the wizard. Optionally, the plurality of web forms were created at least a week before the receiving of the instruction to create the wizard. Optionally, the method includes accessing at least one of the web forms after storing the file, without using the stored file.

There is further provided in accordance with an exemplary embodiment of the invention, a method of creating a software wizard, comprising activating on a computer a wizard creation software; receiving, by the wizard creation software, identifications of a plurality of forms, created at least a day before activating the wizard creation software; and storing by the wizard creation software a file defining a wizard including the plurality of forms.

Optionally, the plurality of forms are configured to be accessible also not through the wizard. Optionally, the method includes receiving by the wizard creation software one or more customization instructions for one or more of the forms and wherein storing the file comprises with the customization instructions.

There is further provided in accordance with an exemplary embodiment of the invention, a method of executing software wizards, comprising running a wizard executor program on a computer; accessing a first non-executable wizard description file by the wizard executor; executing the wizard described by the accessed first description file; accessing a second non-executable wizard description file by the wizard executor; and executing the wizard described by the accessed second description file.

Optionally, accessing the first non-executable wizard description file comprises receiving the file over the Internet.

Optionally, executing the wizard described by the first description file comprises downloading a plurality of forms mentioned by the first description file from a form server remote from the computer running the wizard executor. Optionally, downloading a plurality of forms mentioned by the first description file comprises downloading from a form server not co-hosted with a computer providing the first description file. Optionally, executing the wizard described by the first description file comprises downloading at least one form and displaying the at least one form without altering the code describing the at least one form.

Optionally, executing the wizard described by the first description file comprises downloading at least one form and displaying the at least one form with at least one field of the form disabled. Optionally, executing the wizard described by the first description file comprises determining the order of display of forms of the wizard based on conditions included in the first description file.

There is further provided in accordance with an exemplary embodiment of the invention, a method of executing a software wizard, comprising initiating the execution of a wizard by a client computer; downloading a plurality of forms by the wizard from a form server process separate from the wizard; displaying the downloaded forms in an order defined by the wizard; and collecting user input responsive to the displayed forms.

Optionally, the method includes transferring the collected user input to the form server process. Optionally, the form server process is hosted by a computer separate from the client computer. Optionally, downloading the plurality of forms comprises downloading over a wide area communication network and/or in accordance with a web based data transfer protocol. Optionally, downloading the plurality of forms comprises downloading from a plurality of different form servers. Optionally, initiating the execution of the wizard comprises initiating operation of a wizard executor adapted to execute wizards according to instructions in non-executable wizard description files. Optionally, displaying the downloaded forms comprises displaying at least one of the downloaded forms modified according to instructions of the wizard. Optionally, downloading the plurality of forms comprises downloading substantially all the forms of the wizard before displaying a first form of the wizard. Optionally, downloading the plurality of forms comprises downloading each form immediately before its display.

There is further provided in accordance with an exemplary embodiment of the invention, a method of executing a software wizard, comprising initiating the execution of a wizard on a client computer; determining at least one attribute of a user to which the wizard is to be provided on the client computer; displaying a plurality of forms forming the wizard, in a manner selected responsive to the determined at least one attribute of the user; and collecting user input responsive to the displayed forms.

Optionally, determining the at least one attribute of the user comprises determining a security level of the user. Optionally, determining the at least one attribute of the user comprises determining a technical expertise level of the user. Optionally, displaying the plurality of forms comprises displaying the forms in an order selected responsive to the at least one attribute of the user, such that different users are displayed the forms in different orders. Optionally, displaying the plurality of forms comprises displaying at least one of the forms within one or more disabled fields selected responsive to the at least one attribute of the user, such that different users are displayed the at least one of the forms with different disabled fields.

There is further provided in accordance with an exemplary embodiment of the invention, a software wizard creation unit, comprising a user interface adapted to receive user instructions; a screen; a memory; and a processor configured to receive an instruction to create a wizard through the user interface, to display on the screen forms, to receive customization instructions through the user interface responsive to the displayed forms and to store in the memory a file defining a wizard including a plurality of displayed forms as customized by customization instructions.

Optionally, the processor is in the same building as the screen, memory and the user interface. Optionally, the processor is distanced from the user interface by at least 100 meters. Optionally, the processor is configured to store a reference to the displayed forms in the file and not the entire descriptions of the forms. Optionally, the processor is configured to store a wizard description in the form of a non-executable file.

There is further provided in accordance with an exemplary embodiment of the invention, a wizard execution unit, comprising a user interface adapted to receive user instructions, a screen; and a processor configured to receive through the user interface an indication of a wizard to be executed, to retrieve a non-executable file describing the wizard referred to by the indication and to execute the wizard by displaying forms of the wizard on the screen and receiving user input through the user interface.

Optionally, the wizard execution unit includes a network interface and wherein the processor is configured to retrieve the non-executable file through the network interface from a remote computer. Optionally, the wizard execution unit includes a memory unit including a single housing with the processor and wherein the processor is configured to retrieve the non-executable file from the memory unit. Optionally, the wizard execution unit includes a network interface and wherein the processor is configured to retrieve forms displayed by the wizard through the network interface, while the wizard is executed.

BRIEF DESCRIPTION OF THE DRAWING

Embodiments of the present invention will now be described in the following detailed description of exemplary embodiments and with reference to the attached drawings, in which dimensions of components and features shown are chosen for convenience and clarity of presentation and are not necessarily shown to scale. Generally, only structures, elements or parts that are germane to the discussion are shown in the figures.

DETAILED DESCRIPTION OF SOME EMBODIMENTS

Network Overview

Figure 1:
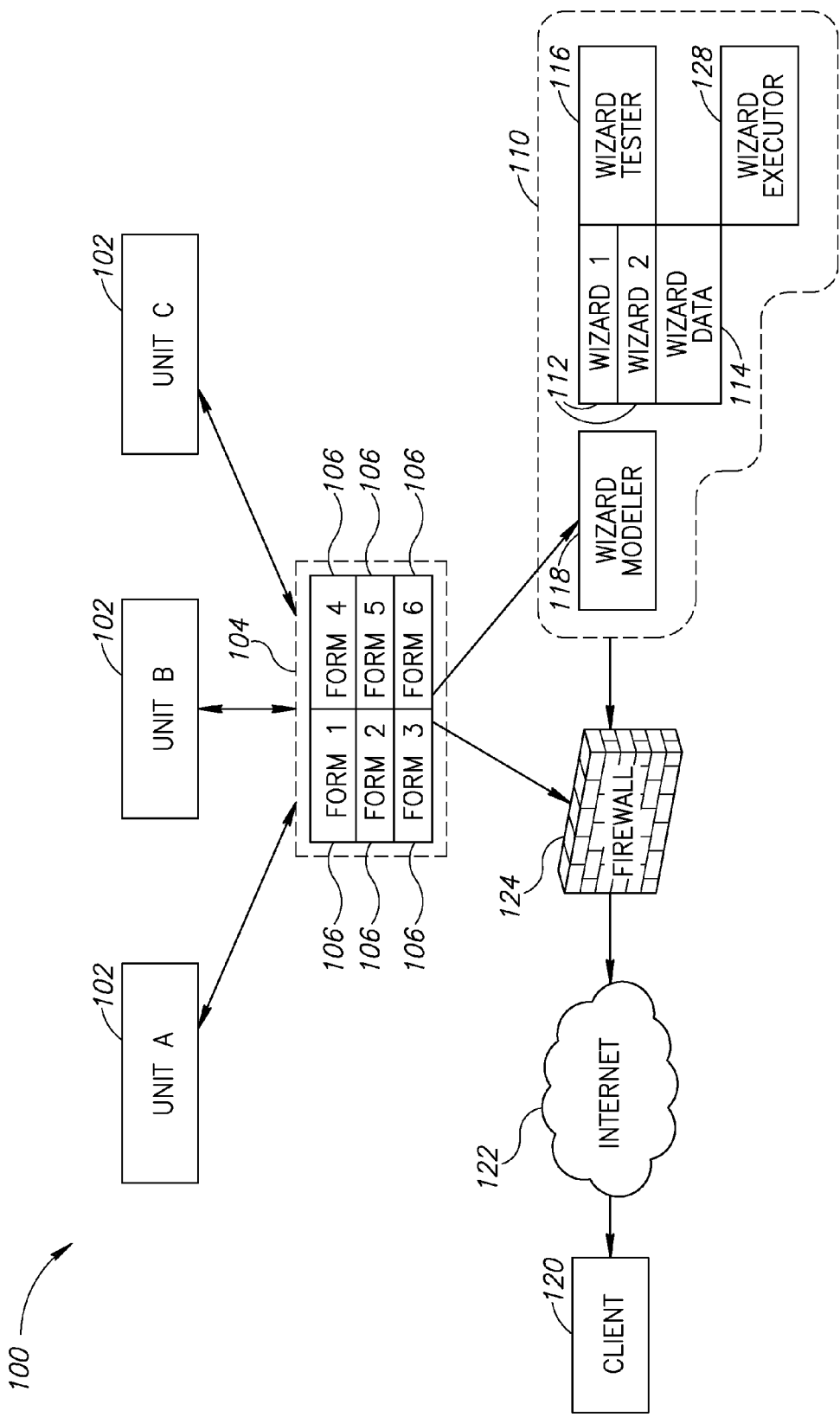
FIG. 1 is a schematic illustration of a configuration system, in accordance with an exemplary embodiment.

FIG. 1 is a schematic illustration of a configuration system 100, in accordance with an exemplary embodiment. System 100 is used to configure one or more communication units 102, which may be, for example, routers, switches, PBXs, IP-PBXs, firewalls or communication gateways. A configuration server 104, optionally operating according to standard web server protocols, such as HTTP and/or HTML, hosts a plurality of forms 106, which are used to configure units 102. Each of forms 106 is used to configure information in one or more of units 102. Forms 106 are optionally accessible by client computers, represented in FIG. 1 by a client 120, through the Internet 122 or any other communication network. In some embodiments, a firewall 124 or any other security device is used to protect configuration server 104 from unauthorized access. As shown, the forms 106 are hosted on configuration server 104, separate from the configured units 102. When a form 106 is changed, server 104 initiates a change on the respective unit 102 or on a plurality of affected units 102. Alternatively, some or all of the forms 106 may be hosted directly on the configured unit 102.

In accordance with some embodiments, configuration system 100 includes a wizard server 110, which is used in generating and/or activating configuration wizards 112. Wizard server 110 optionally hosts a wizard modeler 118, which is used to create wizards, and a wizard tester 116 which tests the resultant wizards. In some embodiments, resultant wizards are stored as executable wizards 112, which may be run on their own. Alternatively or additionally, one or more wizards generated by wizard modeler 118 are stored as a wizard data record 114, which is executed by a wizard executor 128. Optionally, wizard modeler 118 may be accessed remotely, for example from client 120 or any other suitable terminal. The terminal used to access wizard modeler 118 may be located in the same building or even same room as wizard server 110 or may be distanced from server 110, for example by at least 100 meters or even by at least 10 kilometers.

Alternatively or additionally to being located on a separate server, some or all of the elements described as being located on wizard server 110 are hosted by configuration server 104, by units 102 or by clients 120. It is also noted that the elements shown as residing on wizard server 110 need not all be located on the same server, but rather may be distributed between different units.

Operation

Figure 2:
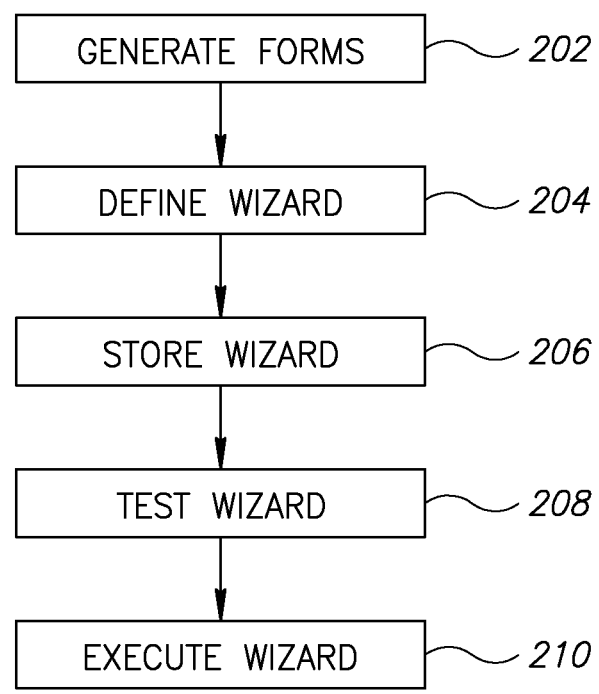
FIG. 2 is a flowchart of acts performed in generating and utilizing a wizard, in accordance with an exemplary embodiment.

FIG. 2 is a flowchart of acts performed in generating and utilizing a wizard by system 100, in accordance with an exemplary embodiment. Configuration forms 106 are generated (202) for one or more units 102. A designer, using wizard modeler 118, defines (204) a wizard based on at least some of the forms 106. The wizard is stored (206) for access by users as a wizard data record 114. In some embodiments, the stored wizard is tested (208) by wizard tester 116 and if any mistakes are identified they are brought to the designer's attention for correction.

When a user wants to use the wizard, wizard executor 128 executes (210) the wizard data record 114, guiding the user through the forms 106 selected for the wizard by the designer.

Referring in more detail to generating (202) forms 106, in some embodiments the forms 106 are generated without relation to generation of the wizard. The forms are optionally created before receiving an instruction to create the wizard, possibly at least a day, a week or even a month or more before the generation of the wizard. Optionally, even after the wizard is generated and provided for utilization by users, the forms 106 included in the wizard are available for separate access to a single form, by users. In some embodiments, at least some the forms included in the wizard are managed by a separate process from wizard executor 128.

The forms 106 are optionally human-machine interface elements which allow users to configure hardware, firmware or software of a controlled system. Forms 106 may include substantially any type of form, which collects substantially any type of information. For example, forms may be used to configure IP addresses, masks, port numbers, operation parameters, hardware types, expected traffic extent and names of units 102. Optionally, the forms are programmed in a markup language such as HTML, without script or other programming language additions. Alternatively, one or more of the forms may have portions represented in a script language, such as JavaScript, for example to verify that the entered content of a field meets rules defining the allowed input in the field. The forms may include substantially any input fields, including free text input fields, numeric input fields, drop down selection lists, check boxes, combo-box fields, multi-line edit fields and/or radio buttons. Specific forms may be associated with one specific unit 102 or may be useable to configure a plurality of different units 102.

In some embodiments, the forms have been previously accessed by the designer and/or the user, before the creation of the wizard. Optionally, the designer and/or user are acquainted with the forms and/or their general format, such that designing and/or using the wizard is easy and does not require training and/or adjustment to a new form environment.

Wizard Modeler

Figure 3:
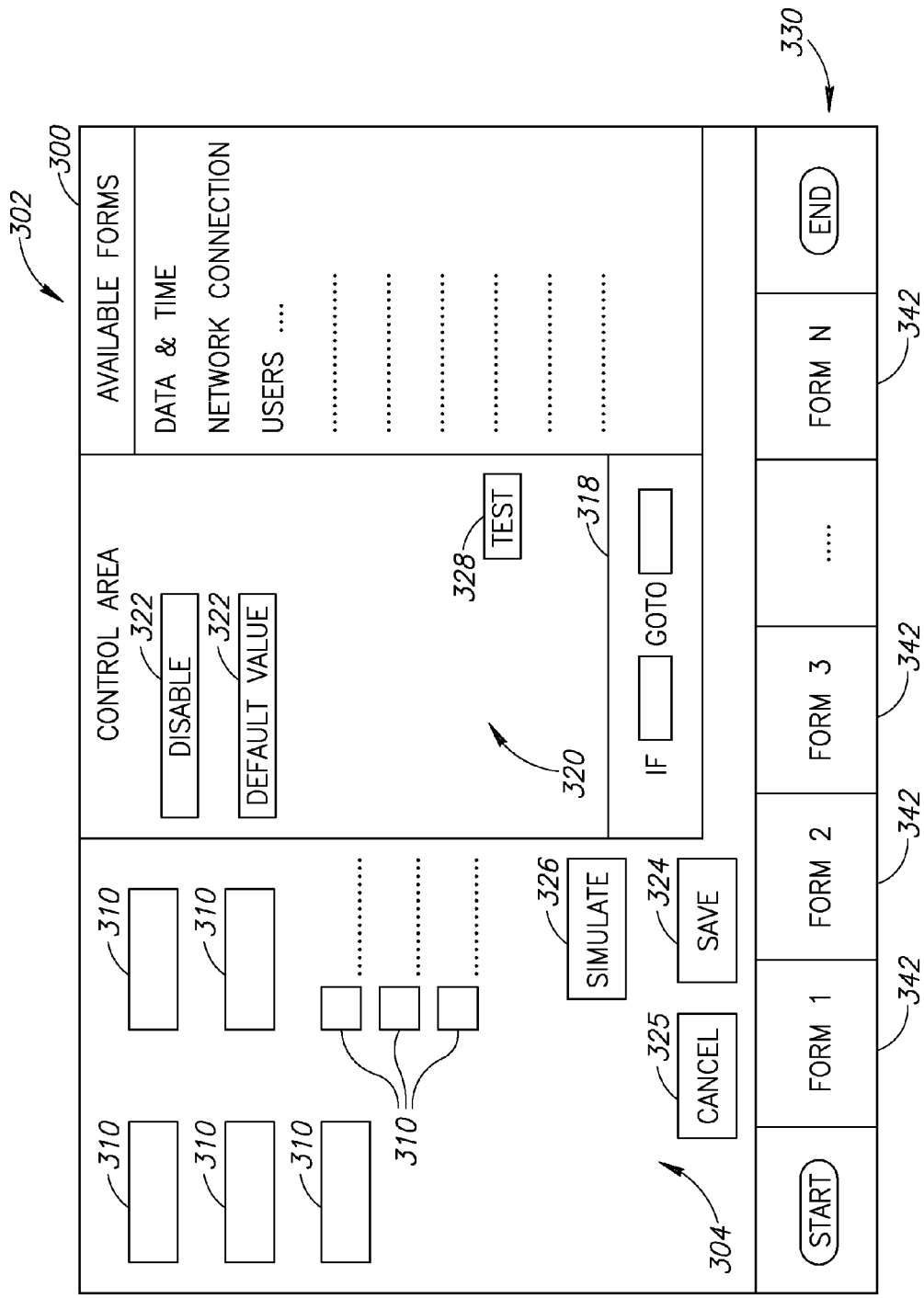
FIG. 3 is a screen shot of a display of a wizard modeler, in accordance with an exemplary embodiment.

FIG. 3 is a screen shot of a display 300 of a wizard modeler 118 during the defining (204) of a wizard, in accordance with an exemplary embodiment. Wizard modeler 118 displays a list 302 of available forms which can be included in a generated wizard. A designer selects one of the forms, which is displayed in a form-area 304 of display 300 for customization, responsive to the selection. The form generally includes a plurality of input receiving fields 310, although a form with only a single input receiving field 310 may also exist. The form may also include display areas including text and/or graphics (not shown) displayed to the user, for example including indications on how to fill out the fields of the form.

In customizing the form in form-area 304, the designer may disable (e.g., grey out) any of the fields 310, may set default values to any of the fields 310 (including disabled fields, in which case the default values become fixed values) and/or may entirely eliminate any of the fields 310. The customization of the fields 310 may be performed using any method known in the art for receiving designer input instructions, including mouse clicking on the field and/or selecting a field and using controls 322 in a control area 320. Upon completion of the handling of the form, the designer optionally actuates a save button 324 or any other suitable control, which stores the form along with its configuration settings in a current wizard file. Other control buttons are optionally also included in wizard modeler 118, such as a cancel button 325 to exit the modeler without saving and/or a simulate button 326 which actuates presentation of the wizard in its current state. In some embodiments, the wizard modeler 118 takes note of the values inserted by the designer into the fields of the form, and these values are used as default values. Alternatively, the values themselves are ignored, but their structure is used to determine the type of value inserted into the field. Further alternatively, the particular values inserted by the designer to the fields are ignored, unless a specific indication that the inserted value is to be used as a default, is received.

The designer may optionally add an additional form to the wizard by selecting another form from list 302. List 302 may include all the forms available from configuration server 104. Alternatively, a system manager may define forms 106 which cannot be included in wizards and these forms 106 are not included in list 302 or are not allowed to be included in generated wizards. In some embodiments, list 302 includes at least 50 or even at least 100 forms from which the designer selects forms to be included in the wizard. It is noted, however, that list 102 may be much smaller, including for example fewer than 30 or even fewer than 20 forms. In some embodiments, list 302 may include forms from a plurality of different servers 104. Optionally, a user uses an "open" control to determine the forms of which server 104 are to be displayed. Alternatively or additionally, the forms are sorted into sub-groups according to the units to which they relate, the roles (e.g., managers, technicians, users) for which they are directed, their complexity and/or any other characteristics, and accordingly the designer navigates between the different sub-groups in search for desired forms.

In some embodiments, the forms 106 included in the currently generated wizard are displayed in a lower bar 330 of display 300. Lower bar 330 optionally displays the forms 106 of the current wizard in the order in which they appear in the wizard. Optionally, each form is represented by a small box 342. Box 342 may display a name of the form, a list of fields of the form, a status of the form (e.g., unchanged in wizard, number of changes) and/or a small view of the form. In some embodiments, the designer may reorganize the forms in lower bar 330 adjusting their order in the wizard and/or may delete forms from the bar, thus removing them from the current wizard. Lower bar 330 may optionally be used to navigate through the forms of the wizard, for example to adjust the configuration of one or more forms. In some embodiments, lower bar 330 displays only some of the forms of the wizard, when the wizard includes more forms than fit on the display.

Optionally, the other forms are accessible using a toggle bar and/or any other display swapping mechanism known in the art.

Optionally, the designer may define one or more forms which belong to the wizard but are not displayed to a user of the wizard. These forms are optionally automatically given default values by the wizard without any need for user intervention. Alternatively or additionally, one or more forms of the wizard are displayed with default values, although the forms, as modified by the wizard, do not include any fields which may be modified by the user. In some embodiments, a designer may include the same form twice, for example with different values of one or more fields which define the element controlled by the form.

In some embodiments, the designer may alter the look and feel of the form, changing colors, fonts, images, patterns and/or other view parameters.

The designer may optionally define two or more forms which are to be displayed to the user as a single form and/or define for a form a plurality of displays into which it is to be broken up. In some embodiments, the designer may combine sub-portions of a plurality of forms 106 into a single page of the wizard.

The forms are optionally displayed by the wizard using an existing graphic user interface (GUI), for simplicity of operation of the wizard and to allow the user to receive the forms in the same format to which he/she is accustomed.

Optionally, the designer may modify previously generated wizards and/or generate new wizards by varying previously generated wizards, for example using a "save as" control. This allows for even faster generation and lower maintenance effort of wizards.

Variable Wizard

Optionally, the designer may define different wizard behaviors for different user logins or different customer types. For example, the designer may define a condition for any of the characteristics of the wizard, based on the role or any other attribute of the user of the wizard. The condition may define whether a form will be displayed to the user, the fields that the user will see and/or be allowed to change, the looks of the form, default and/or fixed values of one or more fields, navigation conditions between the forms of the wizard and/or any other characteristics of the wizard.

In an exemplary embodiment, wizard executor 128 includes an RBAC (role based access control) engine or any other policy enforcement unit, which provides role information of the user to wizard executor 128. Accordingly, the wizard executor 128 controls the display of the wizard. For example, the wizard may have secret forms which are to be displayed only to users with high clearance ratings and/or may have highly technical forms which are to be provided only to users of a technician role. In some embodiments, a wizard may have alternative sets of forms, a first set which is to be displayed only to technicians and a second set to laymen.

Other conditions may also govern the characteristics of the wizard, such as the date, time of day, network load and/or quality of the connection between the client 120 and server 104. For example, the forms may be given a different look during the night than during the day. In an exemplary embodiment, the wizard may be broken up into a larger number of smaller forms when the connection to server 104 is slow, allowing for more time to download a subsequent form 106 from server 104.

It is noted that the task of creating a wizard in accordance with the above described embodiments does not require programming knowledge and is relatively simple, such that substantially any user may serve as a designer and generate a wizard. In some embodiments, a same or very similar user interface as used to execute the wizard is used to create or change the wizard. The simplicity of generation of wizards may be used to generate wizards for short term and/or very specific tasks. While generation of a wizard using complex programming is usually warranted only for highly used sequences, the generation of wizards in accordance with some or all of the above described methods makes the generation of wizards for a local and/or short term task a viable solution.

Further Wizard Options

A test button 328 is optionally used to actuate wizard tester 116. Alternatively or additionally, wizard tester 116 is actuated automatically when work on a wizard is completed.

Wizard modeler 118 is optionally used to generate simple wizards in which the order of displayed forms is fixed and does not change responsive to the user's input. In some embodiments, however, the user may add a conditional instruction after one or more of the forms, allowing progression of the forms in the wizard to vary according to the user's input. For example, after form 2, a conditional instruction may determine whether a specific optional field was filled in and accordingly determine the next form in the wizard. Optionally, the conditional instruction may be entered by the designer in a field 318 of display 300.

In some embodiments, the wizards are based entirely on previously existing forms. Alternatively, in addition to using one or more pre-existing forms, the generated wizards may include forms generated specifically for the wizard. For example, wizard modeler 110 may include an interface for generating forms, such as the interface described in U.S. Pat. No. 6,871,340 to Gillis.

In an exemplary embodiment, in generating the wizard, the wizard developer takes into account the understanding and/or capability of the people intended to use the wizard. For example, for a simple user, a very simple wizard may be generated, such as including only requests for an IP address of a communication box, and user names of associated telephones. More versed users are optionally provided with more complex wizards, requiring, for example, in addition to the above, a trunk type and trunk parameters or other system parameters.

Wizard modeler 118 may be used by a designer directly connected to wizard server 110 and/or by a designer using a client computer connected to wizard server 110 over a communication network, such as the Internet or an Intranet. In some embodiments, wizard modeler 118 is downloaded to a client computer and is run from the client computer. Wizard modeler 118 optionally stores internal copies of the forms 106 in list 302. Alternatively, forms 106 are downloaded from configuration server 104, when they are requested by the designer generating the wizard.

Wizard Storage

Referring in more detail to storing (206) the wizard, in some embodiments the wizard is represented by an ordered list of forms included in the wizard. For each form in the list, a record listing its fields and any changes to the field in the wizard (e.g., default value, grey out) is included. The wizard optionally relates to a layer above forms 106 and does not alter the code of the forms themselves.

Optionally, the stored wizard does not include copies of the forms but rather links to the forms 106, such that if the forms are changed, the forms in the wizard also change. Alternatively, copies of one or more of the forms 106 are stored with wizard data 114, so that the wizard remains stable even if these forms are changed. In some embodiments, wizard server 110 runs an update module (not shown), which periodically and/or upon user instructions checks which forms included in stored wizards, or referenced by stored wizards, have changed. The update module may notify a designer on the changes found and/or may automatically update the wizard.

Reports

In addition to generating the wizard itself, in some embodiments, wizard modeler 118 may be configured to automatically generate one or more reports related to the wizard. Optionally, the one or more reports are provided in accordance with a word processing and/or viewing format, such as the Word, RTF or PDF formats. In some embodiments, the one or more reports include an installation guide provided as a combined text and image file. For each form included in the wizard, optionally in the order of the forms in the wizard, the installation guide includes an image of the form and a discussion of the fields in the form. Optionally, configuration server 104 is preconfigured with explanations of the forms it hosts and each of their fields. In generating the installation guide, modeler 118 takes for each form the explanation of that form and/or of the fields of the form which were not disabled and provides them as instructions for the form in the report.

Alternatively or additionally, a wizard testing guide is generated automatically. The wizard testing guide optionally states the test acts that are to be performed and the results to appear responsive to the test acts. In some embodiments, the descriptions of the test acts to be performed are generated automatically according to the type of field they relate to. Alternatively, the acts to be performed in a test are preconfigured for each form in server 106 and modeler 118 retrieves the information for the forms included in the wizard.

In some embodiments, wizard tester 116 is designed to follow a testing process performed by a human user. Optionally, wizard tester 116 provides the wizard to the human user along with a software module which records the acts of the human user. The recorded acts of the human user are compared to a list of acts that the human user was instructed to perform, for example in a wizard testing guide, and accordingly a report is generated on whether all the instructed acts were performed and/or which acts were not performed. The comparison and report generation may be carried out by the recording software module or by wizard tester 116 or by a combination thereof.

The testing acts in the list optionally include actuating each of the fields that is changeable and verifying that the field was actually changed. Alternatively or additionally, the testing includes attempting to change grayed out fields and verifying that they are not changeable.

Alternatively or additionally to human testing, wizard tester 116 automatically performs the acts in the testing list and checks the results and/or generates an archive of the results, for example in the form of screen shots. In some embodiments, the testing is performed on wizard server 110. Alternatively or additionally, the testing is performed from one or more remote computers.

Wizard Execution

Figure 4:
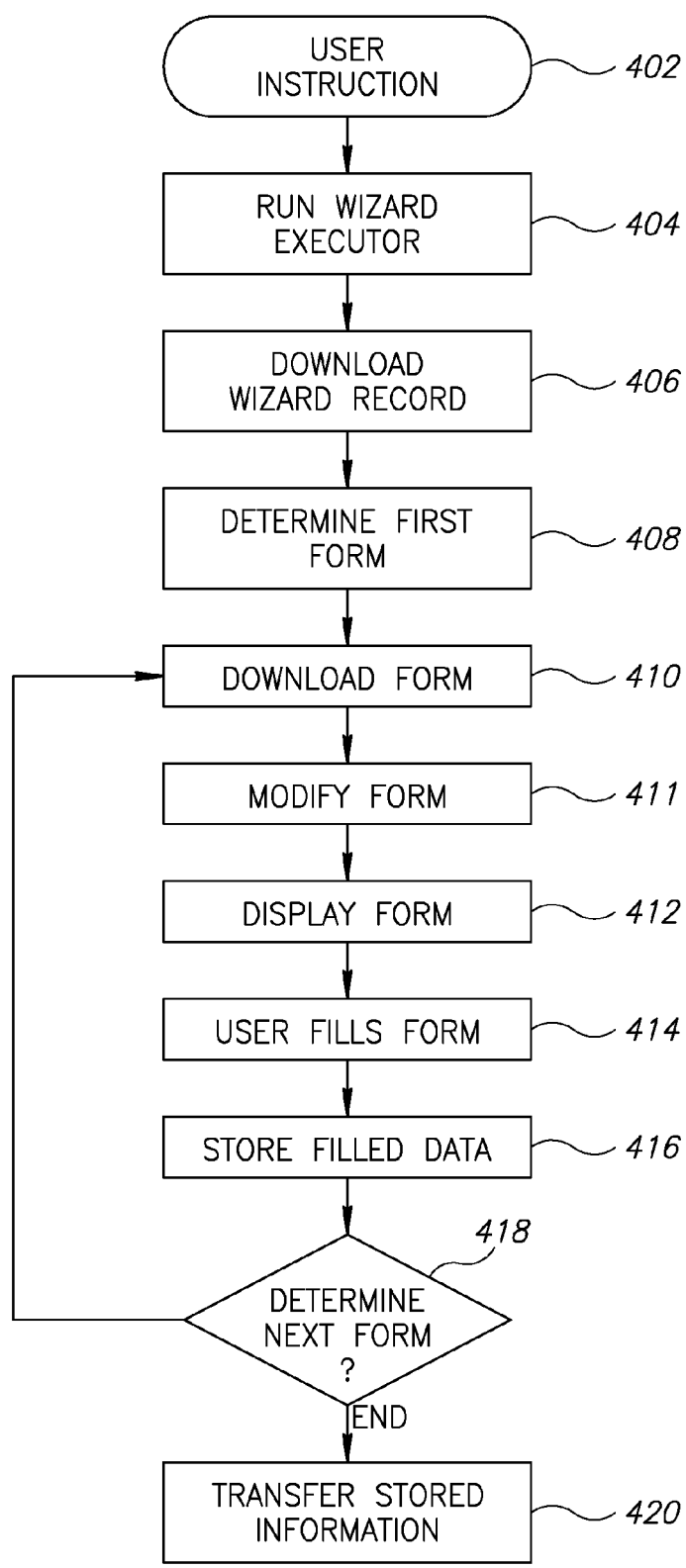
FIG. 4 is a flowchart of acts performed in executing a wizard represented by a wizard data record, in accordance with an exemplary embodiment.

FIG. 4 is a flowchart of acts performed in executing (210) a wizard represented by a wizard data record 114, in accordance with an exemplary embodiment. Upon a user instruction (402) to client 120 to execute a wizard, client 120 runs (404) wizard executor 128 and the wizard data record 114 is downloaded (406) from wizard server 110. The download may be performed by wizard executor 128 or may be performed by a launcher of the wizard executor, such that the wizard data record 114 is provided to executor 128 when it is run. Wizard executor 128 determines (408) from data record 114 the first form 106 to be displayed and downloads (410) the form 106 from configuration server 104. The downloaded form 106 is optionally modified (411) according to the instructions in the wizard data record 114 and the modified form is displayed (412) by client 120. In some embodiments, the form is displayed together with navigation buttons, such as "forward", "back" and "cancel", as is known in the art. The user fills in (414) the displayed form 106 and then actuates the "forward" button. Responsive to the actuation of the forward button, the data filled in by the user is stored (416) locally and the next form 106 in the wizard is determined (418) and the downloading (410), modifying (411), when necessary, and displaying (412) acts are repeated. The handling of additional forms is continued until the last form included in the wizard is completed, at which time the forward button is optionally replaced by a finish button, as is known in the art. After completion of the wizard operation, the locally stored information is transferred (420) to a software on wizard server 110, which manages the configuration with configuration server 104 automatically.

After completion of the wizard operation, the user may choose to run the same or a different wizard immediately or at a later time. The acts of FIG. 4 are then repeated for this wizard. In accordance with the embodiment of FIG. 4, even when running a different wizard, the same wizard executor 128 is run to perform the wizard, although with a different wizard data record 114. Thus, client 120 is required to store or download only a single copy of the executable program required to execute wizards (e.g., wizard executor 128), while being able to run many different wizards based on their data records 114. In some embodiments, executor 128 may be relatively large (e.g., more than 1 Mbyte), while the data records 114 may be very small (e.g., less than 50 Kbytes), for example when they do not include definitions of forms 106. It is noted, however, that advantages of running a single program may exist even when the differences in size between the data records 114 and the executor 128 are not large or do not exist.

Alternatively to transferring the stored information to wizard server 110, the stored information is transferred directly to configuration server 104. In some embodiments, instead of accumulating the user input to forms and sending it all at once, the data of each filled out form is sent separately to configuration server 104.

Referring in detail to running (404) wizard executor 128, in some embodiments, wizard executor 128 is resident or even installed on client 120. Alternatively, wizard executor 128 is downloaded from wizard server 110 when client 120 needs to run (404) wizard executor 128. In some embodiments, wizard executor 128 is downloaded as a script (e.g., a Javascript), which is run by a web browser or other software on client 120. Further alternatively, wizard executor 128 is run on a remote computer, for example wizard server 110, and client 120 merely serves as a terminal which displays forms provided by wizard server 110 and returns user input thereto.

Instead of downloading (406) each form 106 separately, in some embodiments, all the forms 106 of the wizard are downloaded at once immediately after downloading wizard data record 114 or when the first form 106 is required.

Referring in more detail to modifying (411) the downloaded form, in some embodiments, the modifying includes disabling and/or eliminating fields according to instructions in the wizard data record 114. The modifying may also include changing the look of the form, such as adding or removing images, icons and/or other display units.

Optionally, the modifying may include breaking a single form from server 104 into a plurality of displayed forms. For example, when a form from server 104 is very complex, the wizard may be defined to break the form into a plurality of sub-forms displayed by the wizard separately. When the first sub-form is reached in executing the wizard, the form is fetched and the first sub-form of the form is displayed. When filling out the first sub-form is completed by the user, the second sub-form of the form is provided by the wizard and this is repeated until all the sub-forms are displayed. It is noted, that the sub-forms need not include all the fields of the form, as some of the fields may be eliminated in the wizard design. When all the sub-forms have been filled out, the wizard collects the user input to be returned to the form server. The sub-forms may all be displayed consecutively in the wizard or may be distributed between other forms. It is noted that in some embodiments one or more of the forms 106 may be displayed without modification.

Security

In some embodiments, some or all of the forms 106 used by the wizard require that the user meet specific security requirements in order to view or change the forms. Optionally, the wizard checks in advance that the user meets the security requirements of all the forms in the wizard before executing the wizard. Alternatively, wizard executor 128 skips forms of the wizard that the user is not allowed to access. In some embodiments, wizard executor 128 provides the security credentials required in order to access the forms, such that even users that are not allowed to access one or more of the forms 106 in the wizard directly can access the forms through the wizard. In some embodiments, one or more forms 106 are designed with such security requirements that they may be accessed only through a wizard.

Web Based Wizard

As mentioned above, in some embodiments a wizard is executed on client 120 using a general purpose web browser, without any need for software specifically designed for wizard operation. The wizard is operated by a wizard executor 128 hosted, for example, on server 110. In an exemplary implementation, the user accesses the wizard by stating a web address of the wizard, for example on server 110, in a general purpose browser of client 120. Wizard executor 128, based on information in the wizard data record 114 of the accessed wizard, downloads the HTML representation of the first form of the wizard from form server 104 and modifies the HTML representation to provide a general context of the wizard and/or to modify the form according to the specific instructions of the wizard. The modified form is transferred to the browser of client 120 for display and reception of data, which is transferred to wizard executor 128 using standard web methods. Similar changing is performed to the other forms of the wizard.

In some embodiments of the invention, the modifying of the forms to provide a general context of the wizard optionally includes adding a frame with navigation buttons, as is known in the art, by adding HTML or JavaScript code to the HTML representation of the form. The modifying of the form optionally includes adding JavaScript statements to the HTML representation of the form. The added JavaScript statements may be directed at greying out fields of the form and/or to inserting default values. Alternatively or additionally, to using JavaScript statements, the HTML itself may be modified. In some embodiments, rather than erasing HTML statements in order to remove deleted fields, the statements are replaced by statements which present empty fields, in order to prevent the erasure from distorting the layout of the form. Alternatively, fields are not deleted at all, but rather unnecessary fields are disabled.

CONCLUSION

While in the above description the forms are described as being supplied by a single server 104, in some embodiments, wizard server 110 may host wizards which relate to forms hosted on different form servers. Furthermore, wizard server 110 may host one or more wizards which include forms 106 hosted on different form servers in a single wizard. In wizards relating to forms hosted only by a single server, the server address is optionally stated only once, or is even not stated at all in the wizard data, if the form server is a default server. When a wizard relates to forms on a plurality of servers, however, the wizard data optionally states for each form the server from which it is to be fetched and/or to which the user responses are to be returned.

It will be appreciated that the above described methods may be varied in many ways, including, changing the order of steps, and/or performing a plurality of steps concurrently. It will also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used. The use of wizard modeler 118 is not limited to communication networks, but rather may be used with other form access systems and/or web systems, including financial systems, shopping systems and data access systems.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of creating a software wizard, comprising:
receiving, by a computer, an instruction to create a wizard, wherein the wizard is used to assist in performing a task;
displaying by the computer a first form, created separately before receiving the instruction to create the wizard, wherein the first form is selected from a list of separately created forms, wherein a plurality of different forms are included in the list of separately created forms, wherein the different forms each include a unique set of fields, and wherein a plurality of fields within any one of the forms are different from any other of the forms;
receiving by the computer first customization instructions for the first form, wherein the first customization instructions include at least one of instructions to delete, modify, or add a field in a set of fields included in the first form; and displaying by the computer a second form comprising a set of fields that is different from a set of fields in the first form, wherein the second form is created before receiving the instruction to create the wizard and is selected from the list of separately created forms;

receiving by the computer second customization instructions for the second form; and storing a file defining the wizard including the first form and the second form as customized by the first customization instructions and the second customization instructions respectively so that when the file is executed, the first form as customized and the second form as customized are displayed to assist in performing the task, wherein the stored file does not include copies of the first and second separately created forms, but instead includes links to the first and second separately created forms and wherein a description of the first and second separately created forms are not contained in the stored file.

2. A method according to claim 1, wherein the displaying by the computer the first form and the second form comprises displaying one or more forms written in HTML without script additions.

3. A method according to claim 1, comprising accessing one or more of the first form and the second form included in the wizard, after storing the wizard, wherein a user does not use the wizard to access the forms.

4. A method according to claim 1, comprising changing the display of the first form responsive to the first customization instructions received.

5. A method according to claim 1, wherein storing the file comprises storing an executable file.

6. A method according to claim 1, wherein storing the file comprises storing a data file executable by a wizard execution program.

7. A method according to claim 1, wherein the displaying by the computer the first forms comprises displaying before storing the file with substantially the same view as displayed by the stored wizard.

8. A method according to claim 1, comprising generating a report relating to the stored wizard, automatically by the computer responsive to the received customization instructions.

9. A method according to claim 1, comprising displaying by the computer a simulation of the wizard, between receiving by the computer customization instructions.

10. A method according to claim 1, comprising supplying the stored file to a computer for execution of the wizard using the supplied file.

11. A method according to claim 10, wherein supplying the stored file to a computer for execution of the wizard comprises supplying to a computer different from the computer that stored the file.

12. The method of claim 1, further comprising:
periodically checking the stored file for changes; and
in response to detecting the changes to the stored file, notifying a user of the changes found in the stored file and automatically updating the wizard.

13. A method of executing software wizards, comprising:
running a wizard executor program on a computer;
accessing a first non-executable wizard description file by the wizard executor, wherein the first wizard description file includes a first form that contains a first plurality of fields, wherein the first form has been customized by one or more first customization instructions, and a second form that contains a second plurality of fields including at least one field that is different from a field in the first form, wherein the second form has been customized by one or more second customization instructions, wherein when the wizard description file is utilized by the wizard executor the first form and the second form as customized are displayed to assist in performing a task, wherein the wizard description file does not include copies of the first and second forms, but instead includes links to the first and second forms and wherein a description of the first and second separately created forms are not contained in the stored file;

executing a first wizard described by the accessed first description file;

displaying the first form and the second form as customized;

accessing a second non-executable wizard description file by the wizard executor, wherein the second wizard description file includes a plurality of forms as customized by third one or more customization instructions so that when the second wizard description file is utilized by the wizard executor the plurality of forms as customized are displayed to assist in performing a second task;

executing a second wizard described by the accessed second description file; and displaying the plurality forms as customized.

14. A method according to claim 13, wherein accessing the first non-executable wizard description file comprises receiving the file over the Internet.

15. A method according to claim 13, wherein executing the wizard described by the first description file comprises downloading at least the first form and the second form mentioned by the first description file from a form server remote from the computer running the wizard executor.

16. A method according to claim 15, wherein the downloading comprises downloading from a form server not co-hosted with a computer providing the first description file.

17. A method according to claim 13, wherein executing the wizard described by the first description file comprises downloading and displaying the first form and the second form without altering the code describing the first form and the second form.

18. A method according to claim 13, wherein executing the wizard described by the first description file comprises downloading the first form and displaying the first form with at least one field of the first form disabled.

19. A method according to claim 13, wherein executing the wizard described by the first description file comprises determining the order of display of the first forms and the second form of the wizard based on conditions included in the first description file.

20. A method of executing a software wizard, comprising:
initiating the execution of a wizard on a client computer, wherein the wizard is used to assist in performing a task and the wizard's behavior is different for at least a first user and a second user;
determining at least one attribute of a first user to which the wizard is to be provided;
displaying a list including a first plurality of forms forming the wizard, in a manner selected as responsive to the determined at least one attribute of the first user;
collecting user input responsive to the displayed forms;
determining at least one attribute of a second user to which the wizard is to be provided;
displaying a list including a second plurality of forms forming the wizard, wherein the second plurality of forms includes at least one additional form not included in the first plurality of forms, wherein the display of the second plurality of forms is responsive to the determined at least one attribute of the second user that is different than the at least one attribute of the first user; and storing a file defining the wizard, wherein the stored file does not include copies of the first and second forms, but instead includes links to the first and forms and wherein a description of the first and second separately created forms are not contained in the stored file.

21. A method according to claim 20, wherein determining the at least one attribute of the user comprises determining a security level or a technical expertise level of the user.

22. A method according to claim 20, wherein displaying the first plurality of forms comprises displaying the forms in an order selected responsive to the at least one attribute of the user, such that different users are displayed the forms in different orders.

23. A method according to claim 20, wherein displaying the first plurality of forms comprises displaying at least one of the forms within one or more disabled fields selected responsive to the at least one attribute of the user, such that different users are displayed the at least one of the forms with different disabled fields.

* * * * *